(12) United States Patent
Kim et al.

(10) Patent No.: US 10,580,582 B2
(45) Date of Patent: Mar. 3, 2020

(54) MULTILAYER ELECTRONIC COMPONENT

(71) Applicant: SAMSUNG ELECTRO-MECHANICS CO., LTD., Suwon-Si, Gyeonggi-Do (KR)

(72) Inventors: Kyeong Jun Kim, Suwon-Si (KR); Se Hwan Bong, Suwon-Si (KR); Mi Ok Park, Suwon-Si (KR); Jeong Bong Park, Suwon-Si (KR); Hang Kyu Cho, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/973,995

(22) Filed: May 8, 2018

(65) Prior Publication Data

US 2019/0189351 A1 Jun. 20, 2019

(30) Foreign Application Priority Data

Dec. 18, 2017 (KR) .................. 10-2017-0173839

(51) Int. Cl.
*H01G 4/30* (2006.01)
*H01G 4/232* (2006.01)
*H01G 4/008* (2006.01)
*H01G 4/12* (2006.01)
*H01G 4/38* (2006.01)

(52) U.S. Cl.
CPC ............... *H01G 4/30* (2013.01); *H01G 4/008* (2013.01); *H01G 4/1245* (2013.01); *H01G 4/232* (2013.01); *H01G 4/38* (2013.01)

(58) Field of Classification Search
CPC ........ H01G 4/30; H01G 4/008; H01G 4/1245; H01G 4/232; H01G 4/224; H01G 4/248; H01G 4/38; H01G 4/012; H01G 4/1227
USPC ......................................... 361/306.3, 321.2
See application file for complete search history.

(56) References Cited

U.S. PATENT DOCUMENTS

| | | | |
|---|---|---|---|
| 7,331,799 B1 * | 2/2008 | Lee ........................ | H01G 2/06 361/306.3 |
| 2014/0240081 A1 * | 8/2014 | Murowaki ........... | H01H 85/201 337/208 |
| 2015/0114697 A1 * | 4/2015 | Murrell ................. | H01G 4/232 174/255 |
| 2016/0088725 A1 * | 3/2016 | Park ..................... | H05K 1/0271 174/260 |

FOREIGN PATENT DOCUMENTS

JP 11-74147 A 3/1999
KR 10-2016-0035491 A 3/2016

* cited by examiner

*Primary Examiner* — Michael P McFadden
(74) *Attorney, Agent, or Firm* — Morgan, Lewis & Bockius LLP (57) ABSTRACT

A multilayer electronic component includes a multilayer capacitor including a pair of external electrodes respectively formed on both ends opposing each other, and a pair of frame terminals having coupling holes allowing the external electrodes of the multilayer capacitor to be inserted, and separating the multilayer capacitor from a mounting surface, wherein band portions of the external electrodes are bonded to inner surfaces of the coupling holes.

15 Claims, 9 Drawing Sheets

MULTILAYER ELECTRONIC COMPONENT

CROSS-REFERENCE TO RELATED APPLICATION

This application claims the benefit of priority to Korean Patent Application No. 10-2017-0173839 filed on Dec. 18, 2017, in the Korean Intellectual Property Office, the disclosure of which is incorporated herein by reference in its entirety.

TECHNICAL FIELD

The present disclosure relates to a multilayer electronic component.

BACKGROUND

Multilayer capacitors, which may be miniaturized and realize high capacitance, are used in various electronic devices.

Related art multilayer capacitors are mounted on boards through a conductive resin or solder. In this type of mounting, thermal or mechanical deformation stress applied to the board during an actual use phase may be transferred to the multilayer capacitor to damage a portion of the multilayer capacitor or a solder bonding portion.

Also, a dielectric layer of the multilayer capacitor is formed of ferroelectrics, and thus, when a voltage is applied thereto, polarization occurs, to cause residual polarization and a piezoelectric phenomenon. Due to the piezoelectric phenomenon, dipoles are displaced in synchronization with an applied voltage in a direction in which the dielectric layers are stacked through an aligning process and realigning process in a certain direction, generating a vibration sound.

SUMMARY

An aspect of the present disclosure may provide a multilayer electronic component capable of reducing acoustic noise and satisfying requirements for high durability and high reliability against thermal stress and mechanical stress.

According to an aspect of the present disclosure, a multilayer electronic component may include: a multilayer capacitor including a pair of external electrodes respectively formed on both ends opposing each other; and a pair of frame terminals having coupling holes allowing the external electrodes of the multilayer capacitor to be inserted, and separating the multilayer capacitor from a mounting surface, wherein band portions of the external electrodes are bonded to inner surfaces of the coupling holes.

The band portions of the external electrodes may have a quadrangular band shape, the coupling holes of the pair of frame terminals may have a quadrangular band shape corresponding to the shape of the band portions, and four peripheral surfaces of the band portions may be bonded to four inner surfaces of the coupling holes, respectively.

The pair of frame terminals may each include: a pair of vertical frames disposed to be spaced apart from each other; a pair of horizontal frames connecting an upper end and a lower end of the pair of vertical frames; and a middle horizontal frame disposed between the pair of horizontal frames to connect the pair of vertical frames.

Two or more middle horizontal frames may be provided, a plurality of coupling holes may be formed by the middle horizontal frames in a vertical direction, and multilayer capacitors may be installed in the plurality of coupling holes, respectively.

At least one vertical middle frame may be disposed between the pair of vertical frames to connect the pair of horizontal frames, a plurality of coupling holes may be formed by the at least one vertical middle frame in a horizontal direction, and multilayer capacitors may be installed in the plurality of coupling holes, respectively.

A conductive adhesive may be applied between the band portions of the pair of external electrodes and the inner surfaces of the coupling holes.

The multilayer capacitor may include: a body including a plurality of dielectric layers and a plurality of first and second internal electrodes alternately disposed with the dielectric layer interposed therebetween and including first and second surfaces opposing each other, third and fourth surfaces connected to the first and second surfaces and opposing each other, and fifth and sixth surfaces connected to the first and second surfaces, connected to the third and fourth surfaces, and opposing each other, one ends of the first and second internal electrodes being exposed to the third and fourth surfaces, respectively, the pair of external electrodes may include first and second external electrodes, and the first and second external electrodes may include first and second connection portions disposed on the third and fourth surfaces of the body and connected to the first and second internal electrodes, respectively, and first and second band portions extending from the first and second connection portions to portions of the first, second, fifth, and sixth surfaces of the body, respectively.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. For example, a first connection member is disposed on a level above a redistribution layer. However, the claims are not limited thereto. In addition, a vertical direction refers to the above-mentioned upward and downward directions, and a horizontal direction refers to a direction perpendicular to the above-mentioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

Figure 4:
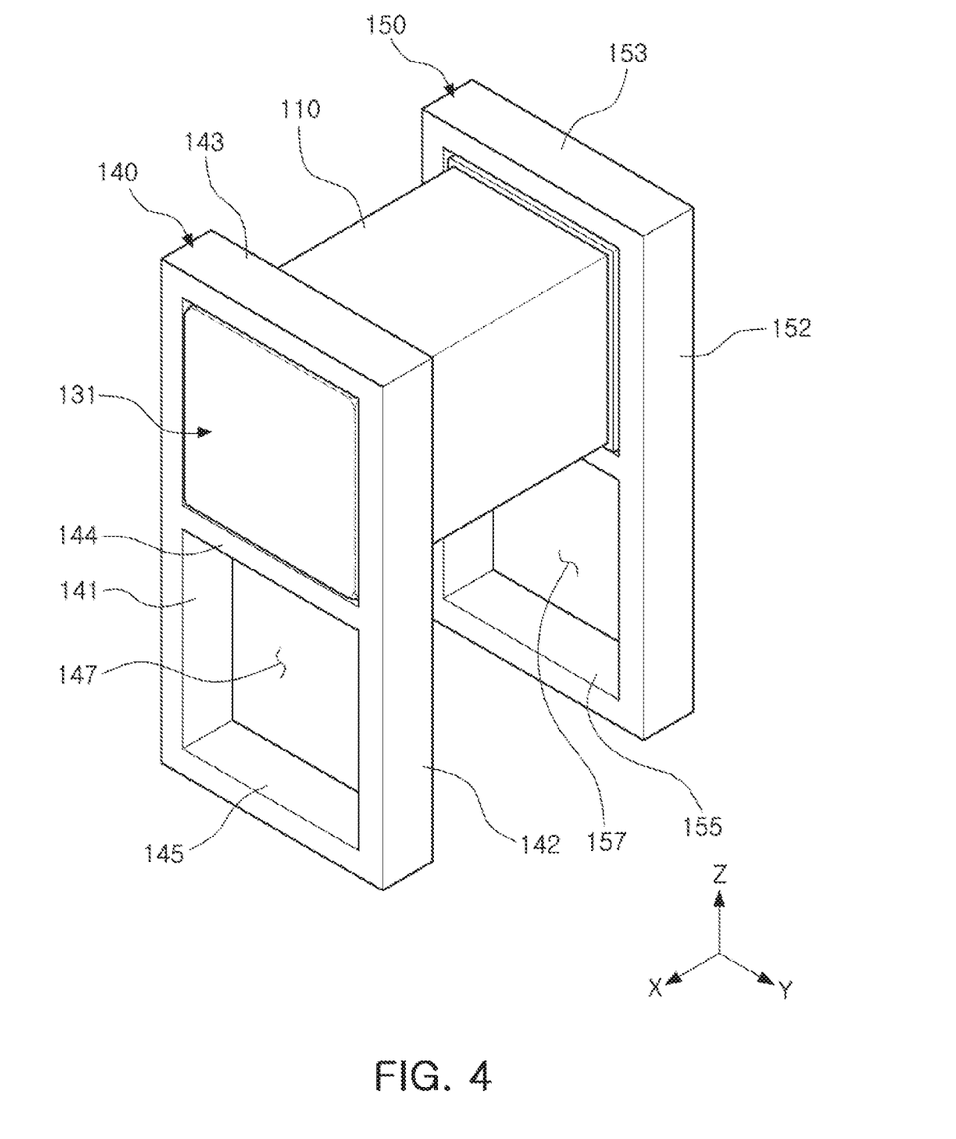
FIG. 4 is a perspective view schematically illustrating a multilayer electronic component according to an exemplary embodiment in the present disclosure.
Figure 5:
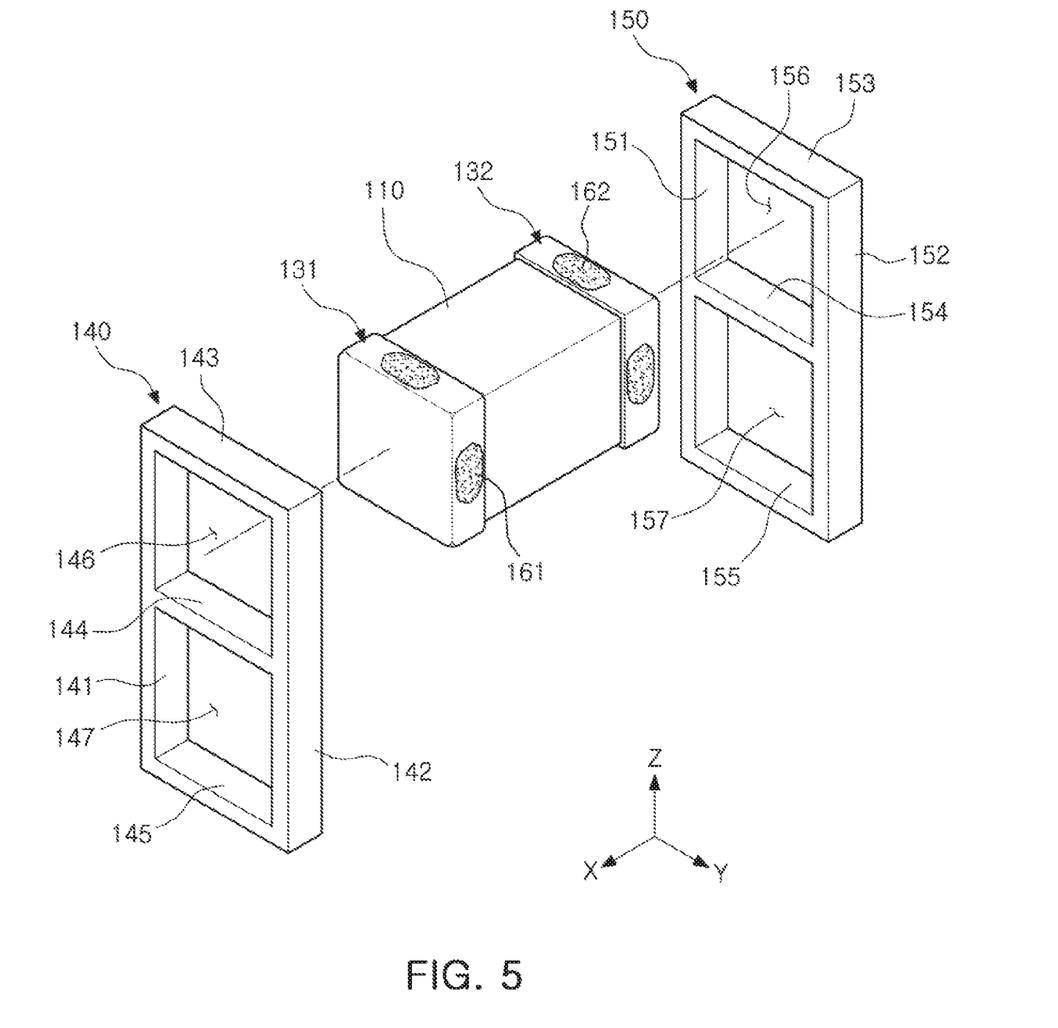
FIG. 5 is an exploded perspective view of FIG. 4.
Figure 6:
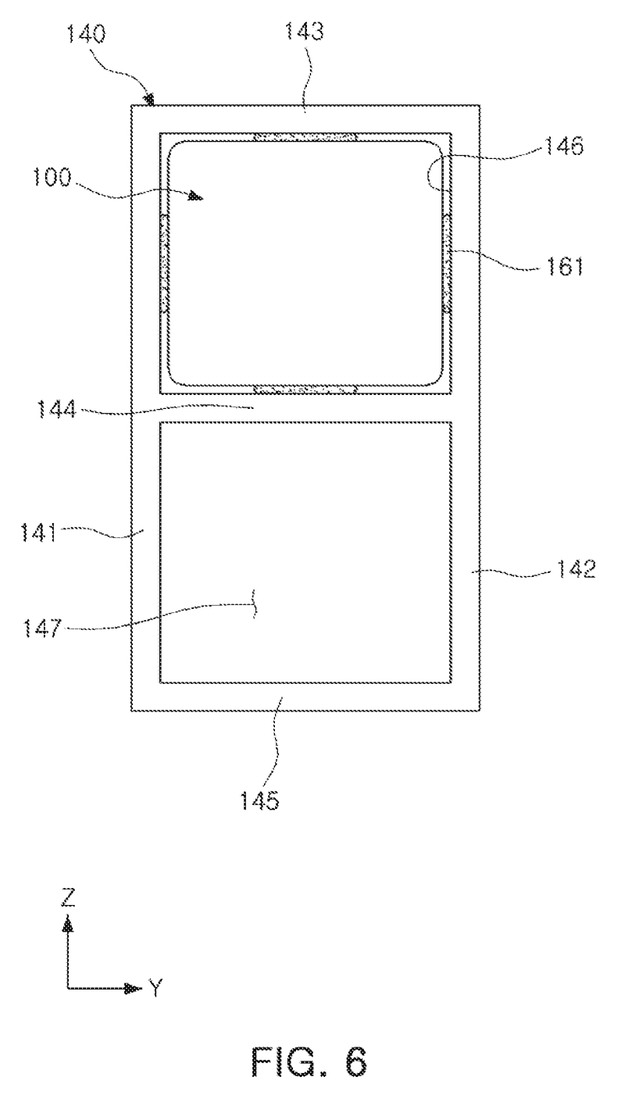
FIG. 6 is a side view of FIG. 4.

FIG. 4 is a perspective view schematically illustrating a multilayer electronic component according to an exemplary embodiment in the present disclosure, FIG. 5 is an exploded perspective view of FIG. 4, and FIG. 6 is a side view of FIG. 4.

When directions are defined to clearly explain exemplary embodiments in the present disclosure, X, Y, and Z shown in the drawings represent a length direction, a width direction, and a thickness direction of a body 110 of a multilayer capacitor, respectively. Here, the thickness direction may be the same as a stacking direction in which the dielectric layers 111 are stacked.

Referring to FIGS. 4 through 6, a multilayer electronic component according to an exemplary embodiment in the present disclosure includes a multilayer capacitor 100 and first and second frame terminals 140 and 150.

Figure 1:
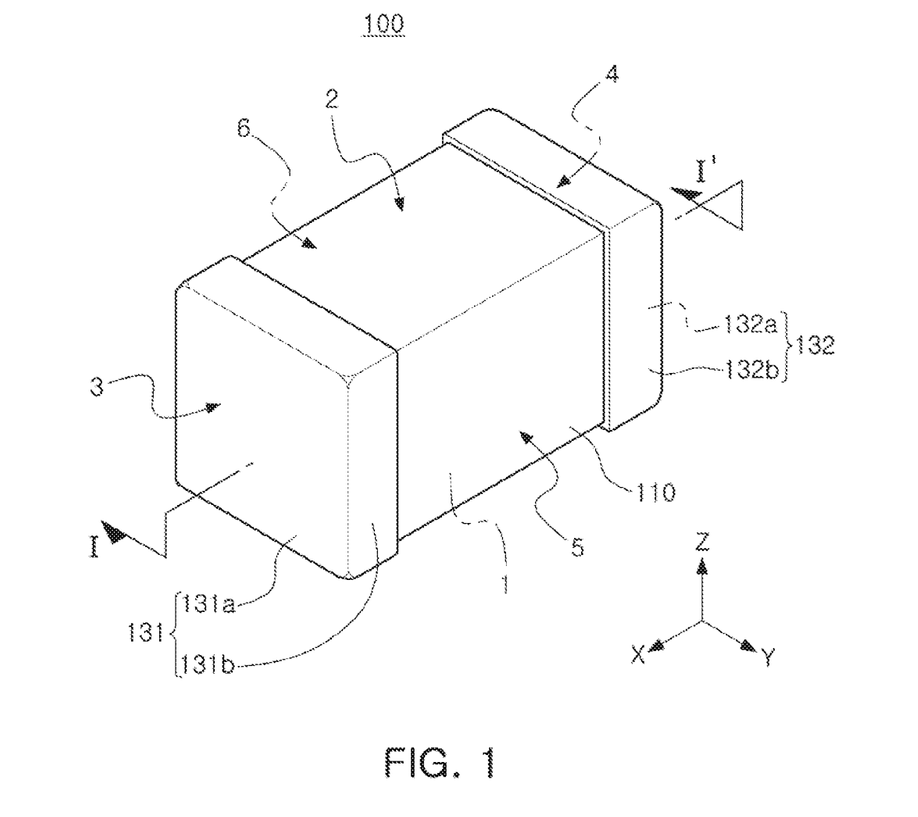
FIG. 1 is a perspective view illustrating a multilayer capacitor applied to the present disclosure.
Figure 2:
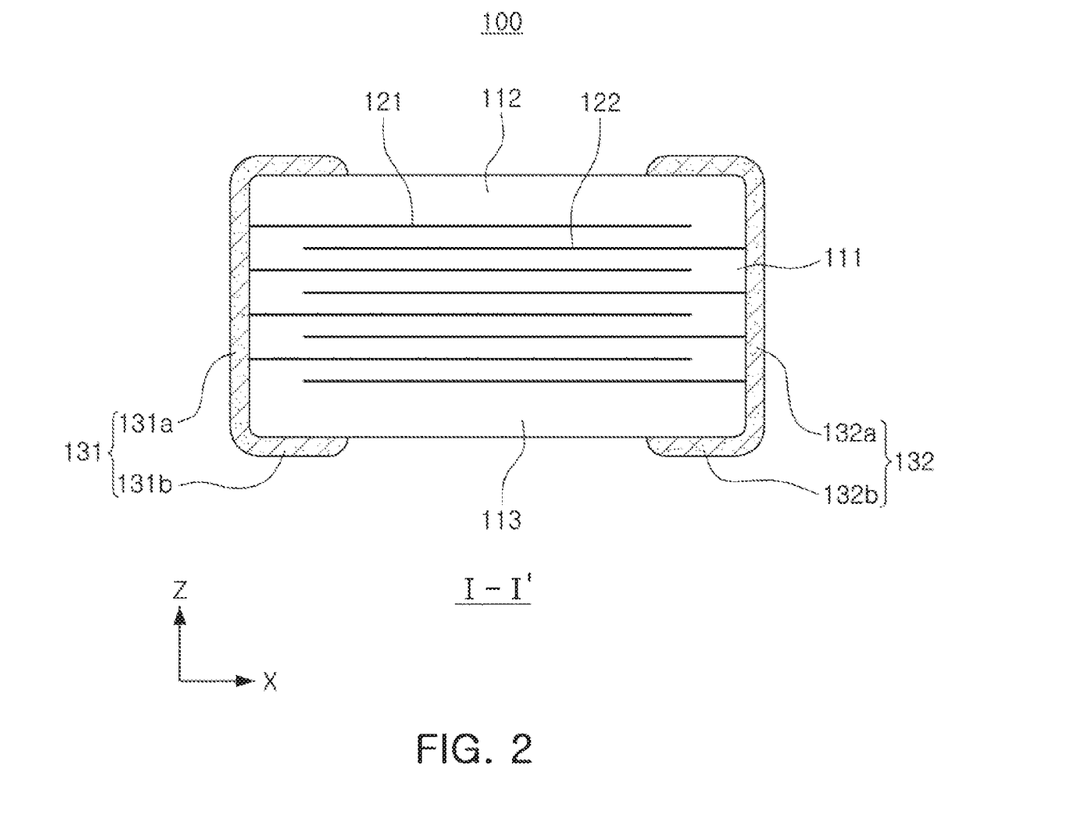
FIG. 2 is a cross-sectional view, taken along the line I-I' in FIG. 1.
Figure 3A:
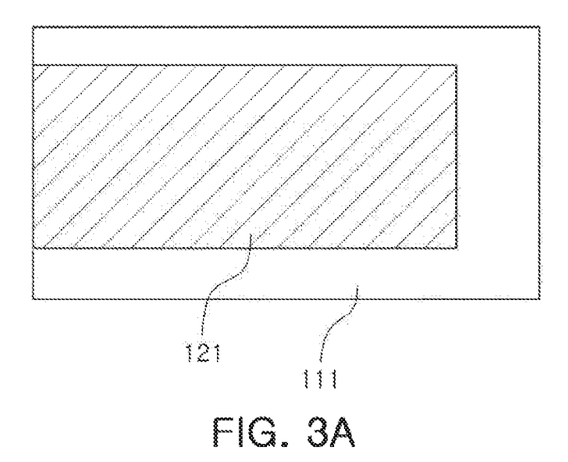
FIGS. 3A and 3B are views respectively illustrating a stacking structure of first and second internal electrodes in the multilayer capacitor of FIG. 1.
Figure 3B:
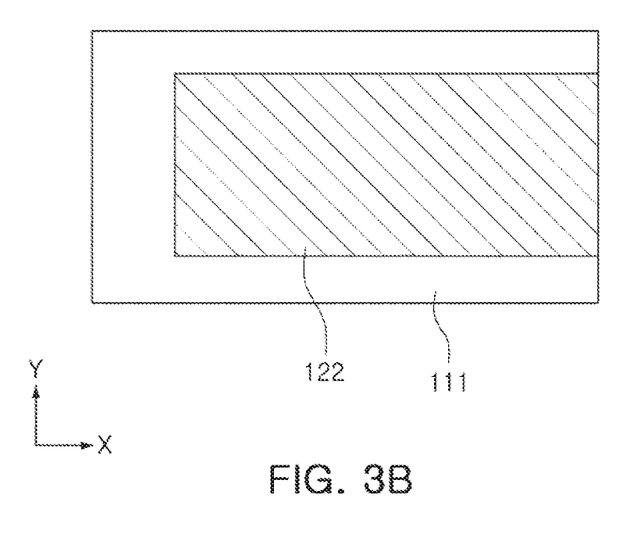

Referring to FIGS. 1 through 3, the multilayer capacitor 100 includes a body 110 and first and second external electrodes 131 and 132 formed on both ends of the body 110 opposed in the X direction, respectively.

The body 110 of the multilayer capacitor 100 is formed by stacking a plurality of dielectric layers 111 in the Z direction and then sintering the same. The body 110 includes the plurality of dielectric layers 111, and a plurality of first and second internal electrodes 121 and 122 alternately arranged with the corresponding dielectric layer interposed therebetween in the Z direction.

If necessary, covers 112 and 113 having a predetermined thickness may be formed on opposing sides of the body 110 in the Z direction. Here, the mutually adjacent dielectric layers 111 of the body 110 may be integrated such that boundaries therebetween may not readily apparent.

The body 110 may have a substantially hexahedral shape but is not limited thereto.

In the present exemplary embodiment, for the purposes of description, both surfaces of the body 110 opposing each other in the Z direction are referred as first and second surfaces 1 and 2, both surfaces connected to the first and second surfaces 1 and 2 and opposing each other in the X direction are referred as third and fourth surfaces 3 and 4, and both surfaces connected to the first and second surfaces 1 and 2, connected to the third and fourth surfaces 3 and 4, and opposing each other in the Y direction are referred as fifth and sixth surfaces 5 and 6. In the present exemplary embodiment, the first surface 1, a lower surface, may be a surface facing a mounting direction.

The dielectric layer 111 may include a ceramic material having a high dielectric constant, for example, a $BaTiO_3$-based ceramic powder, but is not limited thereto.

The $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, prepared by partially employing Ca, Zr, and the like, in $BaTiO_3$, but the present disclosure is not limited thereto.

A ceramic additive, an organic solvent, a plasticizer, a binder and a dispersant may further be added to the dielectric layer 111 together with the ceramic powder. The ceramic additive may be, for example, a transition metal oxide or a transition metal carbide, a rare earth element, magnesium (Mg), aluminum (Al), or the like.

The first and second internal electrodes 121 and 122 are electrodes having opposite polarities and are alternately arranged to face each other in the Z direction with the dielectric layer 111 interposed therebetween. One ends of the first and second internal electrodes 121 and 122 may be exposed through the third and fourth surfaces 3 and 4, respectively.

Here, the first and second internal electrodes 121 and 122 may be electrically insulated from each other by the corresponding dielectric layers 111 disposed therebetween.

The ends of the first and second internal electrodes 121 and 122 alternately exposed to the third and fourth surfaces 3 and 4 of the body 110 may be electrically connected to the first and second external electrodes 131 and 131, respectively.

The first and second internal electrodes 121 and 122 may be formed of a conductive metal such as nickel (Ni) or a Ni alloy, but the present disclosure is not limited thereto.

According to the configuration described above, when a predetermined voltage is applied to the first and second external electrodes 131 and 132, charges are accumulated between the first and second internal electrodes 121 and 122 facing each other.

Here, capacitance of the multilayer capacitor 100 is proportional to an overlap area in which the first and second internal electrodes 121 and 122 overlap each other in the Z direction.

The first and second external electrodes 131 and 132 are provided with voltages of opposite polarities and may be electrically connected to the exposed portions of the first and second internal electrodes 121 and 122, respectively.

The first and second external electrodes 131 and 132 may include first and second connection portions 131a and 132a disposed on the third and fourth surfaces 3 and 4 of the body 110 and connected to the first and second internal electrodes 121 and 122, respectively, and first and second band portions 131b and 132b extending from the first and second connection portions 131a and 132a to portions of the first, second, fifth, and sixth surfaces 1, 2, 5, and 6 of the body 110, respectively.

A plating layer may be formed on the surfaces of the first and second external electrodes 131 and 132, if necessary.

For example, the first and second external electrodes 131 and 132 may include first and second conductive layers, first and second nickel (Ni) plating layers formed on the first and second conductive layers, and first and second tin (Sn) plating layers formed on the first and second plating layers, respectively.

The first and second external electrodes 131 and 132 of the multilayer capacitor 100 are electrically connected to the first and second frame terminals 140 and 150, respectively.

The related art multilayer electronic component using a frame terminal has a structure in which a bonding agent such as conductive resin or solder is applied to a connection portion of an external electrode of a multilayer capacitor and a frame terminal having an L-shaped structure is bonded.

In the case of the structure, two or three multilayer capacitors are adhered using high-temperature solder, or the like, and if adhesion is lowered at an interface between the high-temperature solder and the frame terminal, the frame terminal and the multilayer capacitor may be separated. Also, a size is increased in the length direction, requiring a change in a design of a board. In addition, a shape and a structure are limited and it is difficult to bond several capacitors.

Further, in this type of electronic component, bonding between the frame terminal and the multilayer capacitor is proportional to an amount and shape of solder. That is, an increase in the amount of solder or an increase in a wetting area may increase a bonding force, but the transmission of thermal or mechanical deformation stress is also increased to increase stress of the multilayer capacitor and reduce a vibration sound reduction effect.

Conversely, a decrease in the amount of solder or a decrease in the wetting area may reduce the bonding force to cause the multilayer capacitor and the frame terminal to be separated from each other. In addition, there is a side effect in which a size of the multilayer capacitor is increased by the size of the frame terminal at the same ratio and it is difficult to bond several capacitors due to a limitation in shape and structure.

In the present exemplary embodiment, the first frame terminal 140 includes a pair of first vertical bars 141 and 142 arranged to be spaced apart from each other in the Y direction and a pair of first horizontal bars 143 and 145 connecting upper and lower ends of the pair of first vertical bars 141 and 142, forming a quadrangular frame. A first middle horizontal bar 144 is disposed between the first upper and lower horizontal bars 143 and 145 in the Z direction to connect the left and right first vertical bars 141 and 142.

A first coupling hole 146 is formed in an upper portion of the first frame terminal 140 to allow the first external electrode 131 of the multilayer capacitor 100 to be inserted thereinto. Accordingly, since the electronic component is not increased in the length direction, a design is not required to be changed when the electronic component is mounted on a board.

A first space portion 147 is provided in a lower portion of the first frame terminal 140 to separate the multilayer capacitor 100 from a mounting surface.

Since the first space portion 147 is provided near the mounting surface in the Z direction with respect to the multilayer capacitor 100, acoustic noise may be reduced. Lower portions of the first vertical bars 141 and 142 of the first frame terminal 140 serve as a buffer to absorb external stress such as board deformation, or the like, improving bending strength, and reduce stress applied to the multilayer capacitor, improving thermal strength.

Since the first band portion 131b of the first external electrode 131 of the multilayer capacitor 100 has a quadrangular band shape, the first coupling hole 146 of the first frame terminal 140 may have a quadrangular band shape to correspond to the shape of the first band portion 131b.

Four peripheral surfaces of the first band portion 131b may be bonded to four corresponding inner surfaces of the first coupling hole 146, respectively.

In this exemplary embodiment, since the first band portion 131b and the first coupling hole 146 each have four bonding portions, a coupling strength between the multilayer capacitor 100 and the first frame terminal 140 may be significantly improved.

A first conductive adhesive 161 may be applied between an outer surface of the first band portion 131b of the first external electrode 131 and an inner surface of the first coupling hole 146.

The first conductive adhesive 161 may include high-temperature solder or conductive resin paste but the present disclosure is not limited thereto.

The second frame terminal 150 includes a pair of second vertical bars 151 and 152 and disposed to be spaced apart from each other in the Y direction and a pair of second horizontal bars 153 and 155 connecting an upper end and a lower end of the pair of second vertical bars 151 and 152, forming a quadrangular frame, and a second middle horizontal bar 154 is disposed between the second upper and lower horizontal bars 153 and 155 to connect the second left and right vertical bars 151 and 152 in the Z direction.

A second coupling hole 156 is formed in an upper portion of the second frame terminal 150 to allow the second external electrode 132 of the multilayer capacitor 100 to be inserted therein. Thus, since the electronic component is not increased in the length direction, a design is not required to be changed when the electronic component is mounted on the board.

A second space portion 157 is provided in a lower portion of the second frame terminal 150 to separate the multilayer capacitor 100 from the mounting surface.

Since the second space portion 157 is provided near the mounting surface in the Z direction with respect to the multilayer capacitor 100, acoustic noise may be reduced. Lower portions of the second vertical bars 151 and 152 of the second frame terminal 150 serves as a buffer to absorb external stress such as board deformation, or the like, improving bending strength, and reduce stress applied to the multilayer capacitor, improving thermal strength.

Since the second band portion 132b of the second external electrode 132 of the multilayer capacitor 100 has a quadrangular band shape, the second coupling hole 156 of the second frame terminal 150 may have a quadrangular band shape to correspond to the shape of the second band portion 132b.

Four peripheral surfaces of the second band portion 132b may be bonded to four corresponding inner surfaces of the second coupling hole 156, respectively.

In this exemplary embodiment, since the second band portion 132b and the second coupling hole 156 each have four coupling portions, a coupling strength between the multilayer capacitor 100 and the second frame terminal 150 may be significantly improved.

A second conductive adhesive 162 may be applied between an outer surface of the second band portion 132b of the second external electrode 132 and an inner surface of the second coupling hole 156.

The second conductive adhesive 162 may include high-temperature solder or conductive resin paste but the present disclosure is not limited thereto.

Figure 7:
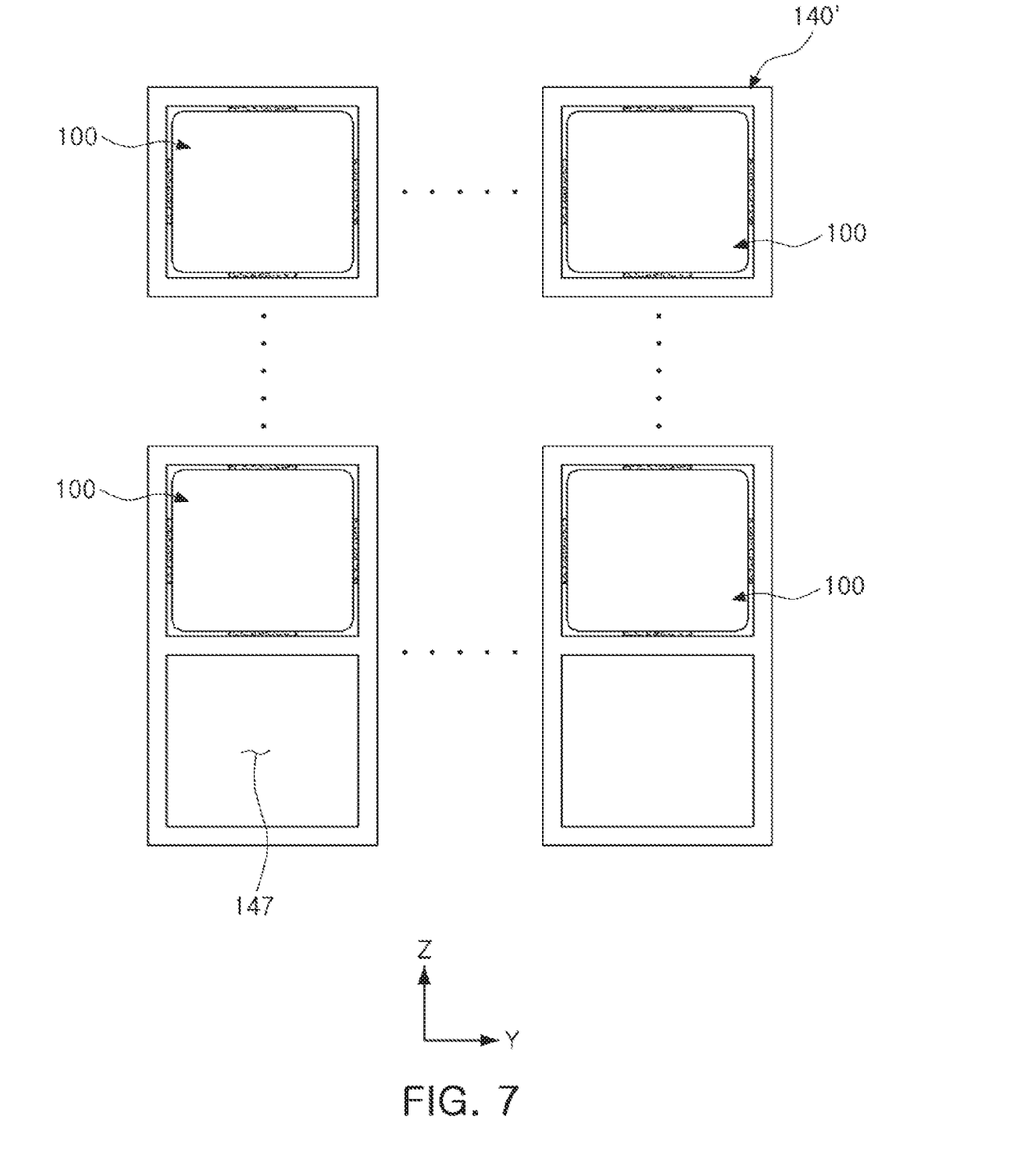
FIG. 7 is a side view schematically illustrating a side surface of a multilayer electronic component for explaining a modification of the present disclosure.
Figure 8:
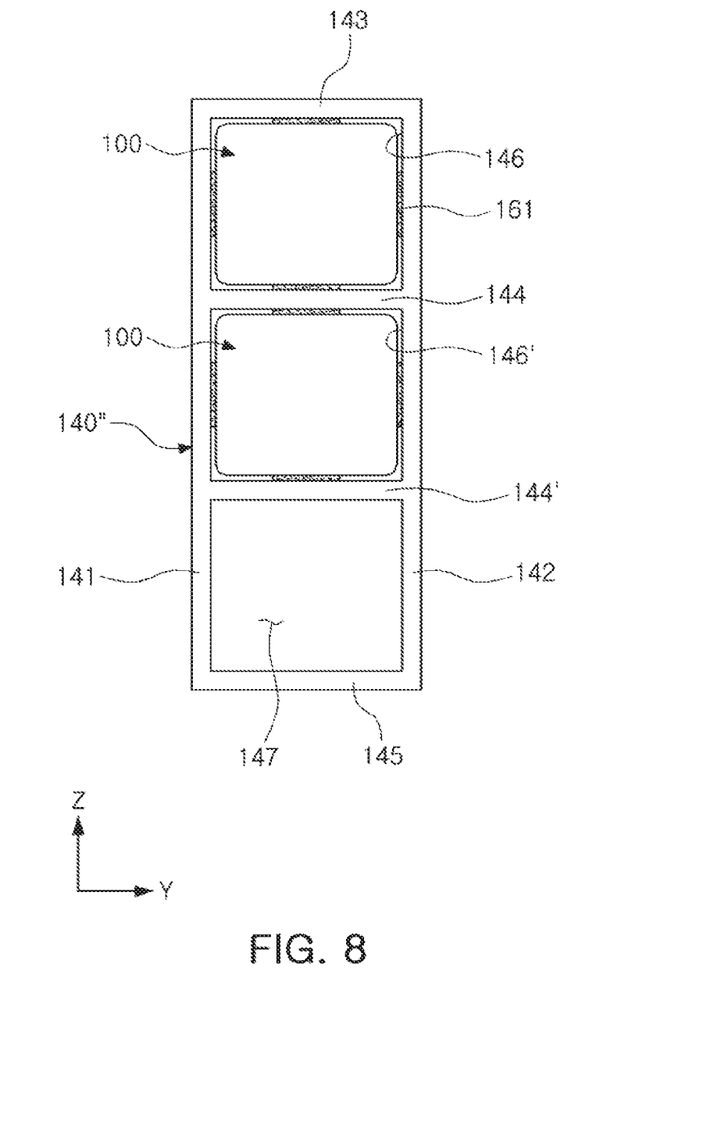
FIG. 8 is a side view of a multilayer electronic component according to another exemplary embodiment in the present disclosure.
Figure 9:
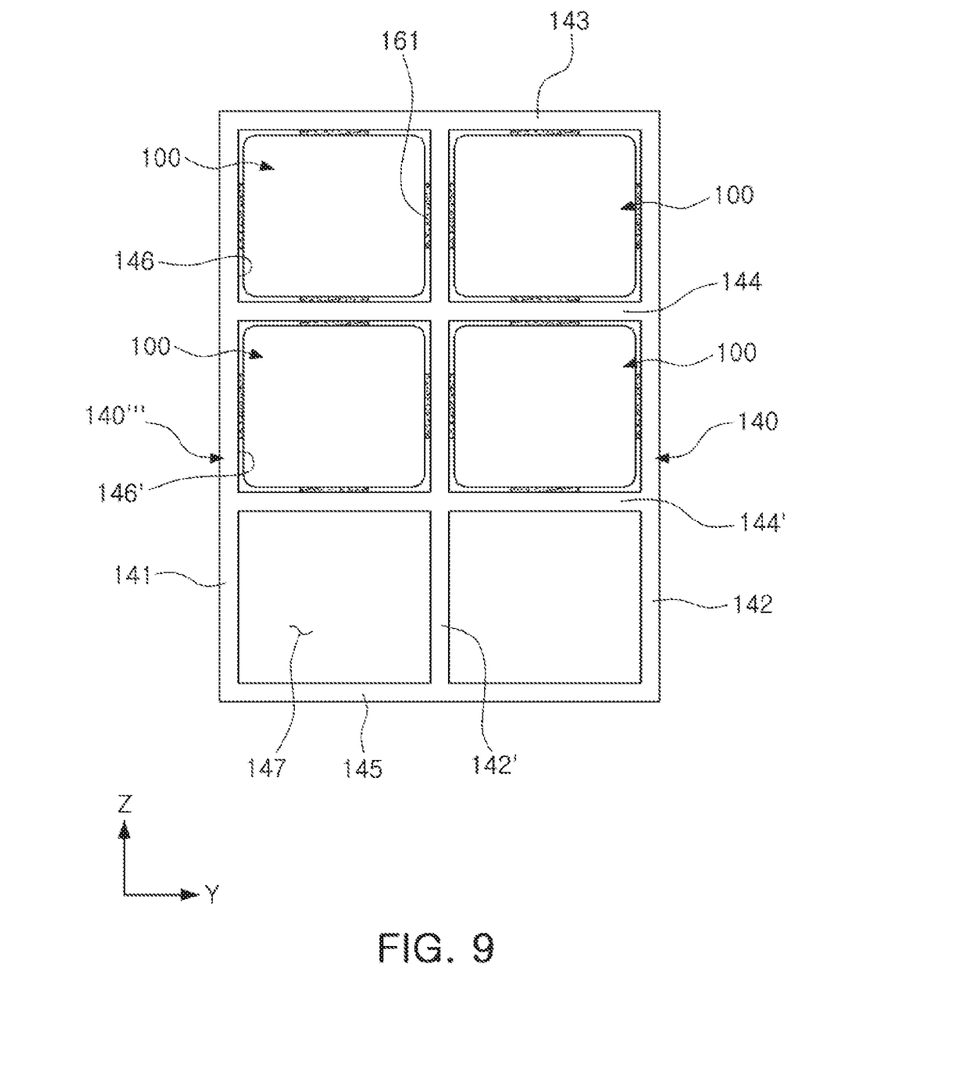
FIG. 9 is a side view of a multilayer electronic component according to another exemplary embodiment in the present disclosure.

FIG. 7 is a side view schematically illustrating a side surface of a multilayer electronic component for explaining a modification of the present disclosure, FIG. 8 is a side view of a multilayer electronic component according to another exemplary embodiment in the present disclosure, and FIG. 9 is a side view of a multilayer electronic component according to another exemplary embodiment in the present disclosure.

Hereinafter, FIGS. 7 through 9 are described as side views illustrating the first frame terminal and the first external electrode. Here, the second frame terminal is similar to the first frame terminal, except that the second frame terminal is connected to the second external electrode, and thus, only the first frame terminal and the first external electrode will be described as a reference but descriptions of the first frame terminal and the first external electrode may be considered to include descriptions of the second frame terminal and the second external electrode.

Referring to FIG. 7, a first frame terminal 140' of the present disclosure includes a plurality of multilayer capacitors 100 to realize high capacitance.

To this end, two or more middle horizontal bars may be included and at least one vertical middle bar may be disposed between left and right vertical bars to connect the upper and lower horizontal bars. In another example, a plurality of coupling holes divided up down left and right sides by a vertical middle bar and a middle horizontal bar may be provided. The plurality of multilayer capacitors 100 may be installed in the plurality of coupling holes, respectively.

Referring to FIG. 8, a first frame terminal 140" according to an exemplary embodiment in the present disclosure may include two or more first middle horizontal bars 144 and 144'. Accordingly, two first coupling holes 146 and 146' are formed in a vertical direction by the first middle horizontal bars 144 and 144' and the multilayer capacitors 100 may be installed in the two first coupling holes 146 and 146' disposed in the vertical direction, totaling two multilayer capacitors 100.

As illustrated in FIG. 9, a first frame terminal 140''' may include at least one vertical middle bar 142' disposed between the first left and right vertical bars 141 and 142 to connect the first upper and lower horizontal bars 143 and 145.

A plurality of first coupling holes may be formed in the horizontal direction by the first vertical middle bar 142', and the multilayer capacitors 100 may be installed in the plurality of coupling holes, respectively. In this exemplary embodiment, the first vertical middle bar is illustrated and described as one bar but the present disclosure is not limited thereto. For example, two or more first vertical middle bars may be provided.

As set forth above, according to exemplary embodiments of the present disclosure, the multilayer electronic component capable of reducing acoustic noise and satisfying high durability and high reliability against thermal stress and mechanical stress may be provided.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a multilayer capacitor including a pair of external electrodes respectively disposed on both ends opposing each other; and
   a pair of frame terminals having coupling holes allowing the external electrodes of the multilayer capacitor to be inserted, and separating the multilayer capacitor from a mounting surface,
   wherein band portions of the external electrodes are bonded to inner surfaces of the coupling holes, and
   wherein the coupling holes extend to an outer surface of the frame terminals, respectively.

2. The multilayer electronic component of claim 1, wherein
   the band portions of the external electrodes have a quadrangular band shape,
   the coupling holes of the pair of frame terminals have a quadrangular band shape corresponding to the shape of the band portions, and
   four peripheral surfaces of the band portions are bonded to four corresponding inner surfaces of the coupling holes, respectively.

3. The multilayer electronic component of claim 1, wherein
   the pair of frame terminals each include a pair of vertical bars disposed to be spaced apart from each other, a pair of horizontal bars connecting an upper end and a lower end of the pair of vertical bars, and a middle horizontal bar disposed between the pair of horizontal bars to connect the pair of vertical bars.

4. The multilayer electronic component of claim 3, wherein
   two or more middle horizontal bars are provided,
   a plurality of coupling holes are formed by the middle horizontal bars in a vertical direction, and
   the multilayer capacitors are disposed in the plurality of coupling holes, respectively.

5. The multilayer electronic component of claim 3, wherein
   at least one vertical middle bar is disposed between the pair of vertical bars to connect the pair of horizontal bars,
   a plurality of coupling holes are formed by the at least one vertical middle bar in a horizontal direction, and
   the multilayer capacitors are disposed in the plurality of coupling holes, respectively.

6. The multilayer electronic component of claim 1, wherein
   a conductive adhesive is applied between the band portions of the pair of external electrodes and the inner surfaces of the coupling holes.

7. The multilayer electronic component of claim 1, wherein
the multilayer capacitor includes a body including a plurality of dielectric layers and a plurality of first and second internal electrodes alternately disposed with the dielectric layer interposed therebetween and including first and second surfaces opposing each other, third and fourth surfaces connected to the first and second surfaces and opposing each other, one ends of the first and second internal electrodes being exposed to the third and fourth surfaces, respectively,
the pair of external electrodes include first and second external electrodes, and
the first and second external electrodes include first and second connection portions disposed on the third and fourth surfaces of the body and connected to the first and second internal electrodes, respectively, and first and second band portions extending from the first and second connection portions to portions of the first, second, fifth, and sixth surfaces of the body, respectively.

8. A capacitive component, comprising:
a pair of frame terminals, each comprising a coupling hole and a spacing hole; and
a capacitor comprising two external electrodes each having a band portion, wherein the band portion of each of the external electrodes of the capacitor is disposed in the coupling hole of a corresponding one of the pair of frame terminals,
wherein the spacing hole is configured to separate the capacitor from a mounting surface when the frame terminals are mounted on the mounting surface, and
wherein the coupling holes extend to an outer surface of the frame terminals, respectively.

9. The capacitive component of claim 8, wherein each of the pair of frame terminals comprises:
two or more vertical bars connected by a bottom horizontal bar, a middle horizontal bar and a top horizontal bar, the bottom horizontal bar being proximal to a mounting surface when the respective frame terminal is mounted on the mounting surface, wherein
the two or more vertical bars, the middle horizontal bar and the top horizontal bar form one or more coupling holes, and
the two or more vertical bars, the middle horizontal bar and the bottom horizontal bar form one or more spacing holes.

10. The capacitive component of claim 9, wherein capacitors are disposed in each of the one or more coupling holes.

11. The capacitive component of claim 8, wherein each of the pair of frame terminals comprises:
two vertical bars connected by a bottom horizontal bar, one or more middle horizontal bar and a top horizontal bar, the bottom horizontal bar being proximal to a mounting surface when the respective frame terminal is mounted on the mounting surface, wherein
the two vertical bars, the one or more middle horizontal bar and the top horizontal bar form one or more coupling holes, and
the two vertical bars, one or the one or more middle horizontal bars and the bottom horizontal bar form the spacing hole.

12. The capacitive component of claim 11, wherein capacitors are disposed in each of the one or more coupling holes.

13. The capacitive component of claim 8, wherein the capacitor comprises a multilayer capacitor.

14. The capacitive component of claim 8, wherein the band portion of each of the external electrodes of the capacitor is bonded to an inner surface of the coupling hole of a corresponding of the pair of frame terminals with a conductive adhesive.

15. The capacitive component of claim 8, wherein the band portions of the external electrodes have a quadrangular band shape,
an inner surface of the coupling holes of the pair of frame terminals has a quadrangular band shape corresponding to the shape of the band portions.

* * * * *